United States Patent [19]

Miller

[11] Patent Number: 4,693,881

[45] Date of Patent: Sep. 15, 1987

[54] SIMULTANEOUS SEPARATION AND CONVERSION TO SULFUR OF $H_2S$

[75] Inventor: Ralph Miller, Pleasantville, N.Y.

[73] Assignee: T-Thermal, Inc., Conshohocken, Pa.

[21] Appl. No.: 755,840

[22] Filed: Jul. 17, 1985

[51] Int. Cl.$^4$ .............................................. C01B 17/02
[52] U.S. Cl. .............................. 423/573 R; 423/558; 423/567; 423/573 G
[58] Field of Search ................... 423/567, 573 R, 575, 423/558, 573 G

[56] References Cited

U.S. PATENT DOCUMENTS 1,384,974  7/1921  Shaw .................................... 423/558

FOREIGN PATENT DOCUMENTS 2819130  11/1978  Fed. Rep. of Germany ... 423/573 R
49-31638  8/1974  Japan ..................................... 423/558
17112  7/1985  United Kingdom ................ 423/558

Primary Examiner—Gregory A. Heller
Attorney, Agent, or Firm—Ferrill and Logan

[57] ABSTRACT

This invention is a regenerable process for converting $H_2S$ to S by (1) reacting the $H_2S$ with $Fe_2(SO_4)_3$ to form S, $FeSO_4$ and $H_2SO_4$; (2) separating the S; oxidizing the $FeSO_4$ and $H_2SO_4$ with a gas containing oxygen in the presence of NO to form $H_2O$, $Fe_2(SO_4)_3$ and a gas with a depleted oxygen content, separating the gas from the $Fe_2(SO_4)_3$ and recycling the $Fe_2(SO_4)_3$ to the S formation reaction.

9 Claims, 4 Drawing Figures

SIMULTANEOUS SEPARATION AND CONVERSION TO SULFUR OF H₂S

BACKGROUND OF THE INVENTION

This invention is concerned with the conversion of $H_2S$ to sulfur. $H_2S$ is found in large quantities as a component of natural gas and in many other situations such as its formation when sulfur-containing petroleum fractions are hydrogenated and when synthetic gas is made from sulfur-containing coal. In each of these and similar cases whenever there are more than minor amounts of $H_2S$ present, the $H_2S$ must be separated from the mixture of which it had been a part before the remaining material can be used. By carrying out the separation, not only is the $H_2S$ separated from most of the other gases, it is recovered in a more concentrated form. In nearly all cases, the $H_2S$ concentration exceeds about 35%. After being separated, the $H_2S$ is processed to recover elemental sulfur.

Another source of $H_2S$ is in the treatment of sulfur dioxide-containing flue gas. Such treatment consists of absorbing the $SO_2$ in an absorbent of one type or another and by further procedures eventually forming $H_2S$. Such a scheme is described in U.S. Pat. No. 4,141,961.

The present widely practiced method used to convert $H_2S$ to sulfur is the classical Claus process and some of its more ingenious modifications. A brief description of this process is contained in Hydrocarbon Processing vol. 61, No. 4 p. 109 (1982). This process is used in hundreds of installations all over the world. There is a voluminous literature describing its various aspects. The use of the Claus process to convert appreciable amounts of $H_2S$ to sulfur is so prevalent and so fixed in the minds of those involved in making sulfur from $H_2S$ that the decision to employ this method is automatic. No other possibility is ever considered. Because of this knee-jerk reaction, the disadvantages and limitations of the process are automatically acceptd and automatically provisions are made to overcome them. Providing these provisions is expensive but tolerated.

The disadvantages and limitations of the process are inherent in its chemistry and its use of air as the other reactant. The overall reaction can be summarized:

(1) $2H_2S + Air[O_2 + 3.76\ N_2] = 2S + 2H_2O + 3.76\ N_2$

At the temperature required to carry out the reaction over the usual alumina catalyst, the equilibrium mixture formed still contains an appreciable amount of $H_2S$. To convert more of the $H_2S$ to sulfur, the gas mixture is cooled below the sulfur condensation temperature. The condensed sulfur is separated from the gas. The separated gas is reheated and contacted with a second catalyst bed to reestablish the equilibrium. These steps are repeated several times until 95% to 96% of the $H_2S$ has been converted to sulfur. The remaining gas still contains so much $H_2S$ that it cannot be incinerated to sulfur dioxide and vented to the atmosphere. Consequently, Claus plant tail gas must be processed in a second gas treating installation.

From the preceding paragraph, it is evident that the use of the Claus process to convert $H_2S$ to sulfur requires an expensive installation. Moreover, only about 95% or so of the $H_2S$ is converted. To this must be added the cost of the equipment to separate the $H_2S$, the cost of operating the separation equipment plus the capital and operating cost to process the tail gas.

The tail gas of most Claus process installations is treated by contact with a solution containing an air regenerable oxidizing agent. The $H_2S$ is absorbed by the solution and quickly oxidized to form elemental solid sulfur and water. The resulting slurry is separated from the $H_2S$ contacting step and then contacted with air to regenerate the oxidant. The sulfur in the slurry is separated from the solution either before or after the air contacting. The choice depends upon the characteristics of the system that is used, local circumstances, and the likes and dislikes of the process designer.

A large number of air regenerable systems have been devised. One of the first to enjoy widespread use is the Stretford process. It employs an aqueous solution containing sodium carbonate, sodium vanadate and 1,4-anthraquinone disulfonic acid. A second process widely used is the Giammarco-Vetrocoke Process. This process uses a solution containing sodium carbonate, sodium arsenate and arsenite. A recently described process is the Sulfint process. This process employs a ferric chelate as the oxidant. The iron is reduced from the trivalent state to a ferrous complex. Subsequently, by contacting the aqueous solution containing the ferrous iron complex with air, the iron is oxidized back to the trivalent state and recycled. This process is described in some detail in Hydrocarbon Processing vol. 61 No. 3 pages 169–172 (1982). Another widely used process is the Takahax Process which uses sodium 1,4-naphthoquinone 2-sulfonate as the air regenerable oxidant.

The ability of these symptoms to remove practically all of the $H_2S$ from an $H_2S$-containing gas mixture is due to the conversion of the $H_2S$ to sulfur. Since the sulfur is not soluble, as such, in any of these aqueous solutions, no equilibrium is established. Because the $H_2S$ is removed from the solution almost as quickly as it dissolves, the ability of the solution to continue to dissolve $H_2S$ is unimpaired. It is this property of these systems that enables them to achieve any degree of $H_2S$ removal required or desirable. The necessary condition is sufficient gas-liquid contact.

In all of these processes, while the conversion of the $H_2S$ to sulfur takes place rapidly, the rate of regeneration of the oxidant is slow. Usually, only 10% to 20% of the oxygen in the air supplied to the regeneration step reacts. While air is free, it cannot be moved without cost. Moreover, low air utilization requires large volume equipment so that the cost of moving the air does not become excessive.

Very often $H_2S$-containing mixtures also contain appreciable amounts of $CO_2$ as well as not insignificant amounts of hydrocarbons. In the combustion step of the Claus process, the hydrocarbons burn to water vapor and $CO_2$. Substantial amounts of $CO_2$ cause operating difficulties when operating the Claus process. The high temperatures employed in the combustion chamber cause the $CO_2$ to react to some extent with $H_2S$ to form carbonyl sulfide. The COS is objectionable and the subsequent operations of the process must be carefully controlled to bring to a minimum its concentration in the Claus plant tail gas. As the $CO_2$ content of the gas increases, the heating value of the gas goes down. As a result it becomes necessary to add fuel gas to the $H_2S$-containing gas so that the final gas mixture reaches the necessary reaction temperature in the combustion chamber. This fuel addition is necessary in addition to providing extensive preheat of the H₂S containing gas and the combustion air.

Claus plant tail gas treating processes which use an alkali carbonate as the H₂S absorbent are also deleteriously affected if required to handle gas streams whose concentration of $CO_2$ approaches 30%.

Two other processes have been proposed for treating gas containing very small concentrations of H₂S. One is described in German Pat. No. 2,819,130 November, 1978. In this disclosure the H₂S-containing gas is contacted with aqueous solutions containing an appreciable concentration of sulfuric acid, minor amounts of both copper sulfate and ferric sulfate as well as trace amounts of nitrate or nitrite. During the contacting most of the ferric sulfate is reduced to ferrous sulfate, part of the copper is precipitated as cupric sulfide particles along with elemental sulfur particles. The resulting slurry is treated with elemental oxygen in an autoclave at a temperature in excess of the melting point of sulfur, i.e. 120° C., at a pressure in excess of the vapor pressure of the solution. Under these conditions the ferrous ion is slowly oxidized to ferric ion, the copper sulfide is oxidized to copper sulfate and molten sulfur is formed. Under pressure, the molten sulfur can be separated from the aqueous solution. The regenerated ferric ion-containing solution can then be reused.

The other process which has been proposed for removing the sulfur from a gas in the form of very diluted hydrogen sulfide is de Loisy, U.S. Pat. No. 1,516,915. In this process the gas containing the H₂S is contacted with an acidic ferric sulfate solution. Elemental solid sulfur is formed along with sulfuric acid and ferrous sulfate. Ferric sulfate is consumed:

(2) $H_2S + Fe_2(SO_4)_3 = S + 2FeSO_4 + H_2SO_4$

The sulfur is then separated from the solution in which it had been formed.

The separated solution is processed to regenerate the ferric sulfate from the sulfuric acid and ferrous sulfate. To accomplish this regeneration de Loisy employs two oxidation reactions as shown in the patent page 1, column, 2, lines 51–62

(3) $6 FeSO_4 + 2 HNO_3 + 3H_2SO_4 = 3 Fe_2(SO_4)_3 + 2NO + 4H_2O$ (4) $2 FeSO_4 + H_2SO_4 + 2HNO_2 = Fe_2(SO_4)_3 + 2NO + 2H_2O$

De Loisy requires that these reactions be carried out at an elevated temperature from the explanation provided in the section of the patent cited above.

The de Loisy invention is described succinctly on page 2 of the patent column 1, lines 3 through 18 which reads:

"For this operation the ferrous liquid to be regenerated first serves to absorb the mixture 2NO+O₂ evolved in a previous treatment. For that purpose the ferrous liquid is caused to trickle in an absorption tower, at the bottom of which enters the mixture of air and oxide of nitrogen. In proportion as it passes down, the mixture becomes laden with nitric acid and nitrous acid constituting the oxidizing agent. This liquid collected at the bottom is then suitably heated so that it is thereby converted into ferric salt and gives up in the form of NO the nitric reagent it has absorbed and which serves for the treatment of a new quantity of ferrous liquid"

In this process the absorption apparatus is open to the atmosphere. Consequently, the gas leaving its contact with the ferrous liquid is at atmospheric pressure. The maximum pressure employed in the process is equal to the pressure in the system at the location where air enters the system. This maximum pressure cannot exceed the sum of the prevailing atmospheric pressure plus the hydrostatic pressure created by the total height of liquid between the location at which the air enters the system and the location at which the nitrogen plus any excess air leaves its contact with the ferrous liquid. In other words, the maximum superimposed pressure in the system is equal to the pressure created by the hydrostatic head just described. Moreover, as the nitrogen plus any excess air moves from the location at which air enters the system to the ferrous liquid-atmosphere interface, the pressure of the undissolved gas continually diminishes.

The reaction between ferrous sulfate and nitric acid requires a temperature that cannot be substantially below 80° C. as explained by de Loisy—page 1, lines 51–55.

According to de Loisy, the NO oxygen-carrier, or oxygen transfer agent termed catalyzer by de Loisy, once entering the system in which the ferrous is regenerated to ferric sulfate, except for insignificant make-up quantities, never leaves the system. In other words, when the nitrogen separates from its contact with the ferrous liquid at atmospheric pressure, the nitrogen is accompanied by an insignificant amount of NO.

In the words of the patent, page 2, column 1 lines 59 through page 2 column 2 line 70:

"In all cases it will be understood that with an absorption column sufficiently high, by suitably controlling, on the one hand, the stream of air and nitrous oxide and, on the other hand, the afflux of the acid ferrous sulfate, it is possible to completely reoxidize the latter, without allowing the escape of the catalyzer which moves to and fro from the top to the bottom of the absorption apparatus and which does not issue either with the ferric liquid from which it has been expelled by the heat."

The relatively low pressure at which the de Loisy process is carried out necessitates the installation of quite elaborate gas-liquid contacting means to prevent the escape of NO. This requirement is necessary because the reaction at atmospheric pressure of NO and O₂ is notoriously slow. To provide the required gas-liquid contacting means requires a very high capital investment. This very high capital investment causes the de Loisy process to be economically unattractive. In addition to this economically unattractive feature of de Loisy, it suffers from a second draw-back. According to de Loisy the ferrous liquid to be regenerated first serves to absorb the mixture 2NO+O₂ and becomes laden with nitric and nitrous acid constituting the oxidizing reagent. De Loisy describes on page 1, column 2, lines 69–76 the reaction of NO and oxygen to form nitrogen dioxide and its further reaction with water in which the NO₂ is converted to a mixture of nitric and nitrous acid:

(5) $2NO + O_2 = 2NO_2$ (6) $2NO_2 + H_2O = HNO_3 + HNO_2$

The patent is silent with regard to the possibility of a reaction between $NO_2$ or nitrous acid and ferrous ion at low temperatures. Why this possibility is not mentioned can only be conjected. Without being concerned about the reason for this omission, it can be stated as a fact, that at a temperature as low as 0° C., $NO_2$ or nitrous acid and ferrous ion react at an appreciable rate to oxidize the ferrous ion to ferric ion concomitantly with the reformation of NO. Not only does this reaction take place at low temperatures it takes place at low concentrations of the reactants.

For example, at a temperature of 0° C., employing a ferrous ion concentration of 1 millimole per liter, i.e. 0.056 grams of ferrous ion per liter; and a nitrous acid concentration of 4 millimoles per liter, i.e. 0.252 grams per liter; more than 20% of the ferrous ion is oxidized to ferric ion in three (3) minutes. It has been found that the reaction goes much more rapidly at:

(a) ambient and higher temperatures;
(b) higher concentrations of $NO_2$ or nitrous acid; and
(c) higher concentrations of ferrous ion.

By employing ferrous sulfate-sulfuric acid solutions of any practical concentrations at temperatures that might be economically feasible, it becomes substantially impossible to obtain, except momentarily, a ferrous ion-containing solution in which there is more than a trace of nitrous acid.

Because $NO_2$ or nitrous acid reacts quickly with ferrous ion to form ferric ion and NO, it is impossible to keep NO completely out of the gas phase. To avoid having more than insignificant quantities of NO leave with the nitrogen in the de Loisy process, an exceedingly elaborate gasliquid contacting apparatus must be used. Under any practical set of conditions within the purview of the de Loisy disclosure, it is substantially impossible to avoid the loss of appreciable amounts of NO when the nitrogen is vented to the atmosphere.

Because of these two reactions, the oxidation of NO with $O_2$ to form $NO_2$ which is very slow, at low pressures, and the oxidation of ferrous ion to ferric ion by nitrous acid or $NO_2$ which is rapid avoiding significant losses of NO is neither technically nor economically feasible when operating in accordance with the teachings of de Loisy.

If the limitations of the de Loisy process described above did not exist, and if, in actuality, it could be carried out precisely in accord with the disclosure in the patent, it is clear from reactions (2) and (3) above that for every 4 moles of NO which are evolved in the oxidation step, 4 moles of ferric sulfate are formed. The four (4) moles of NO which are evolved are converted to two moles of $HNO_3$ and two moles of $HNO_2$ in the absorption apparatus. That is, a mole of NO moves, in the language of the patent, "to and fro from the top to the bottom of the absorption apparatus" for each mole of ferric sulfate regenerated.

The fundamental concepts of this invention are fundamentally different from that of de Loisy as will be evident from the following description and explanation.

OBJECTS OF THE INVENTION

It is an object of this invention to substantially completely convert to sulfur $H_2S$ in a gas whether the $H_2S$ concentration is very high or present in trace quantities.

A further object of this invention is to be able to carry it out in equipment that is reasonable in cost.

A further object is to be able to carry out the invention consuming modest quantities of utilities per unit weight of sulfur formed.

A further object of the invention is to convert $H_2S$ to sulfur using an inexpensive, available, oxidizing agent which in the presence of an oxygen carrier, is readily regenerated by the oxygen in air.

A still further object of this invention is to efficiently use the oxygen in the air supplied to the process.

The above objectives and others that will be evident from the description below are attained by employing a series of reactions in a novel sequence and novel manner.

SUMMARY OF INVENTION

In its simplest form the process which constitutes this invention consists of the following steps:

The $H_2S$-containing mixture is contacted with an acidic iron sulfate solution in which an appreciable amount of the iron is in the ferric state and the remainder in the ferrous state to form elemental solid sulfur, ferrous sulfate and sulfuric acid as shown in the following reaction:

(7) $H_2S + Fe_2(SO_4)_3 = S + H_2SO_4 + 2FeSO_4$

The solution enriched in ferrous sulfate and sulfuric acid is separated from the sulfur.

The sulfur-free solution is contacted with a gaseous mixture containing oxygen and nitric oxide, the number of moles of oxygen in the mixture being not less than one-fourth of the number of moles of ferrous sulfate to be converted to ferric sulfate, to form ferric sulfate and water from the ferrous sulfate and sulfuric acid in accordance with the following reaction:

(8) $4FeSO_4 + 2H_2SO_4 + O_2 = 2H_2O + 2Fe_2(SO_4)_3$

The resultant gaseous mixture containing less oxygen and substantially all of the initial nitric oxide is separated from the enriched ferric sulfate solution.

The enriched or regenerated ferric sulfate solution is recycled to the $H_2S$ contacting step.

In many instances it is economically attractive to dispose of the nitric oxide separated from the regenerated ferric sulfate solution. Under other conditions it is economically attractive and technically feasible to recover the bulk of the nitric oxide and recycle it.

DETAILED DESCRIPTION OF THE INVENTION

In carrying out the first step of the process, i.e. intimate contacting of the $H_2S$-containing mixture and the ferric sulfate solution, any kind of suitable gas-liquid contacting equipment is suitable, recognizing that solid, elemental sulfur will be formed. Because solid sulfur particles are formed, the equipment selected should be capable of operating for prolonged periods without becoming fouled or inoperative by solid sulfur particles.

In most instances it is desirable to have the $H_2S$-containing gas and the ferric sulfate solution flow counter-currently to each other. Suitable equipment includes: several venturi contactors arranged for counter-current contact between the $H_2S$-containing gas and the ferric ion-containing solution; a gas-liquid contacting column whose internals are in a grid-like pattern so that downward flowing solution sweeps off any sulfur particles which tend to adhere to any of the solid surfaces; through which the gas and solution flow counter-currently.

The particular type of gas-liquid contacting used in the $H_2S$ oxidation step in most instances will not affect the choice of the equipment used in the regeneration portion of the process. For this reason, the detailed description below is confined primarily to the different regeneration procedures that can be used in practicing the invention.

Figure 1:
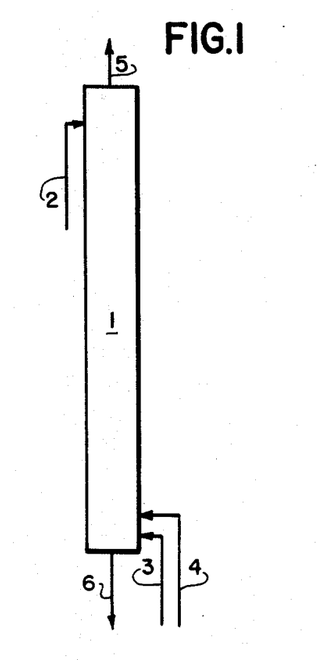
FIG. 1 is a flow diagram of the simplest method of carrying out the invention. In this version, no attempt is made to recover any of the nitric oxide.

In FIG. 1, column (1) is a counter-current gas-liquid contacting device. The internals of the column may be bubble-cap trays, sieve trays or any suitable packing which provides intimate gas-liquid contacting with a minimum of short-circuiting. The ferrous sulfate-containing solution from the $H_2S$ contacting step is fed to the column's top inlet by means of line (2). Air is fed to the column's bottom inlet by means of line (3). Nitric oxide is fed to the column by means of line (4) through a lower column inlet slightly above the air inlet. Nitric oxide plus nitrogen plus any excess air leaves the column through the column's top outlet and flows to the atmosphere or disposal by means of line (5). The regenerated ferric sulfate solution leaves the column through its bottom outlet and flows by means of pipe (6) to the $H_2S$-contacting step not shown.

It is desirable to use as concentrated a solution of iron sulfate as is convenient. For example, the feed to the column can conveniently contain between 17% and 18% ferrous sulfate, close to one third as much sulfuric acid as ferrous sulfate and a little less than half as much ferric sulfate as sulfuric acid, the balance being water. More dilute solutions can be used and may be desirable under some circumstances. Solution somewhat more concentrated can be used if suitable precautions are taken to avoid the temperature falling to a level at which ferrous sulfate comes out of solution.

With a solution whose composition is close to that described above, the column can be conveniently operated in the range of about 20° C. to 40° C. In addition to taking precautions to avoid ferrous sulfate coming out of solution, two other aspects of this step in the process must be considered. In order for the desired reaction to take place, oxygen must react with NO to momentarily form $NO_2$. This reaction can take place both in solution and in the gas phase. It so happens that in both instances the rate of reaction by which $NO_2$ is formed from NO and oxygen is favored at lower temperatures. The rate at which $NO_2$ oxidizes ferrous sulfate goes more quickly at higher temperatures but as has been explained above, it goes at an appreciable rate at even very low temperatures. The overall reaction which takes place is exothermic. Although heat is evolved, the heat capacity of the overall system is substantial so that the temperature rise is moderate. Under some circumstances it is advantageous to equip the column with internal cooling means so that the overall operation is carried out at the optimum temperature which has been found for a given system.

In this variation of the process (FIG. 1), all the nitric oxide fed to the system is wasted. To operate in this mode economically, very substantial amounts of ferric sulfate must be produced for each mole of nitric oxide consumed. A corollary of this is that each mole of NO must go through the cycle NO to $NO_2$ to NO a large number of times as it moves upward in the column from bottom to top.

For purposes of explanation a theoretical stage in the reaction column can be defined as a section of column in which on the average, 2 moles of NO go through the above cycle. This is the equivalent of a mole of $O_2$ reacting per stage. By suitable design and employing conditions as described below, it is eminently feasible to construct and operate a column which will have the equivalent of 60 stages.

The overall reaction is exothermic. If the solution fed to the regeneration step contains somewhat more than 15% ferrous sulfate and somewhat more than 5% sulfuric acid so that a pound mole of ferric sulfate is produced for every two thousand pounds of solution fed to the regeneration column, the heat evolved is close to 67,000 Btu or 34 Btu per pound of solution passing through the column. The specific heat of the solution is about 0.75. Consequently, if no cooling is provided, the temperature of the solution will rise about 44° F. or about 24° C.

The rate at which the NO reacts with $O_2$ is a function of the temperature. The lower the temperature, the more rapid the reaction. Consequently, it is desirable to keep the temperature within the column below about 45° C. If the temperature of the solution entering the column is reduced too low, then some of the ferrous sulfate will tend to come out of solution. By using slightly less concentrated solutions and precooling the ferrous sulfate solution feed to the column, the column can be operated without internal cooling. By providing internal cooling, somewhat more concentrated solutions can be used. Because with internal cooling the rate of reaction between the NO and $O_2$ is maintained at a relatively high rate, and the rate of this reaction is the rate determining variable in the process, although not essential, it is preferred to employ a column with internal cooling.

The other important variable determining the rate of reaction between NO and $O_2$ to form $NO_2$ is the partial pressure of each reactant. Since two molecules of nitric oxide react with each molecule of oxygen, the rate at which they react is proportional to the product of the square of the NO partial pressure multiplied by the oxygen partial pressure. Since the reaction between NO and $O_2$ is a slow reaction at atmospheric pressure, the reaction rate can be increased by carrying out the process at an elevated pressure. Carrying out the process at an elevated pressure has an additional advantage. If a pound mole of NO (30 lbs.) is to react with 60 pound moles of oxygen (1920 pounds) contained in air and the feed to the reactor per mole of NO is 61 moles of oxygen plus its accompanying nitrogen, the number of moles of nitrogen in the feed will be close to 230. The total number of pound moles of gas will be 292. This volume of gas at atmospheric pressure will occupy about 111,000 cu. ft. However, if the gas is compressed to about 8 atmospheres absolute, its volume will be reduced to one-eighth of the above volume or about 13,750 cu. ft. This reduction in volume combined with the increase in reaction rate at elevated pressures enables the process to be carried out in much smaller equipment per mole of ferric sulfate regenerated. Consequently, operating at an elevated pressure provides many advantages. The only real cost is the cost of the compression equipment and the energy expended to compress the reactants. On balance, it becomes economically attractive to operate at pressures well above atmospheric. The particular pressure to employ varies with local conditions.

In many instances the optimum pressure to employ from an economic stand-point is close to eight (8) atmospheres absolute. To speed the reaction between NO and $O_2$, to minimize the loss of NO and to simplify the disposal of NO when it goes to waste, it is advantageous to operate at even higher pressures, that is, at pressures up to 10 or 12 atmospheres or even higher. Although these advantages accrue at these higher pressure, in many instances the advantages when so operating do not compensate for the increased cost.

It has been explained that in de Loisy the gas leaving contact with the ferrous liquid is at atmospheric pressure. In the claims below the expression super-atmospheric pressure is employed. This is defined as the minimum pressure exerted by the gas when it leaves contact with the ferrous liquid which minimum pressure is in excess of five (5) pounds per square inch above atmospheric pressure.

As mentioned above, in this version of the invention none of the NO which reaches the top of the regeneration reactor is recovered. In the above example, each mole of NO that passes through the system reacts with sixty moles of oxygen to form 120 moles of ferric sulfate. These 120 moles of ferric sulfate react with 120 moles of $H_2S$ to form 120 moles of elemental sulfur. In terms of pounds, the consumption of 30 pounds of NO enables 3,840 pounds of sulfur to be formed and recovered. As long as the equipment costs are tolerable, forming and recovering nearly two tons of sulfur while consuming 30 pounds of NO, or its equivalent as nitric acid, 63 pounds, is economically attractive.

Since NO is lost continuously, NO must be fed continuously to the regeneration reactor. This NO can be supplied in many different ways. The simplest is to feed $NO_2$ to the reactor. Another method is to generate a mixture of NO and $NO_2$ by reacting sodium nitrite with nitric acid. The gaseous mixture of oxides of nitrogen is compressed and fed to the reactor. There are other ways of accomplishing this, one of which will be described in detail below.

In nearly every instance, carrying out the process at an elevated pressure is economically attractive except under those conditions where the amount of $H_2S$ to be removed and converted to sulfur is very small.

Figure 2:
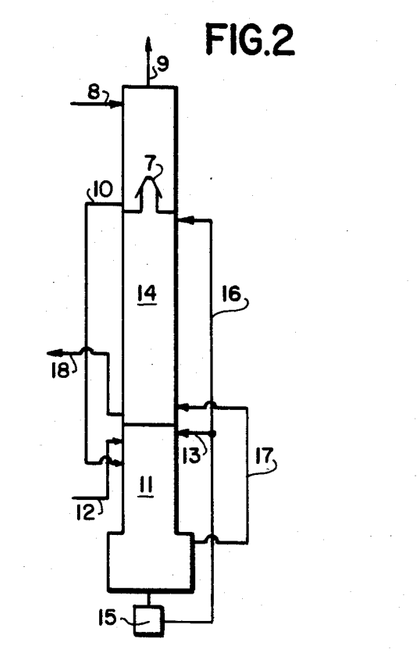
FIG. 2 is a flow diagram of the preferred method of carrying out the invention. In this method every attempt is made to recover all of the nitric oxide and the air fed to the process is used at close to 100 percent efficiency.

FIG. 2 depicts a more complex method of carrying out the invention. In this version of the invention every attempt is made to avoid the loss of any NO - obviously an operating concept different from that shown in FIG. 1. This is accomplished by employing the ferrous sulfate solution to absorb NO before the solution enters the regeneration reactor.

Diagrammatically, this is shown in zone (7) of the column in FIG. (2) made up of zones (7), (11) and (14). The ferrous sulfate solution enters zone (7) close to its top by means of pipe (8). As the solution moves downward it contacts an upward flowing gas stream composed of $N_2$ and NO. The ferrous sulfate solution preferentially absorbs NO. Nitrogen containing a trace of NO is vented from the top outlet of zone (7) by means of pipe (9). The rich $FeSO_4$ solution containing dissolved NO leaves zone (7) through its bottom liquid outlet and by means of pipe (10) flows to the upper liquid inlet of zone (11). Compressed air also flows into an upper inlet of zone (11) by means of pipe (12). A recycle stream also flows into the upper section of zone (11) by means of pipe (13). The mixture of gas and solution flow downward in zone (11). Zone (11) contains packing to provide intimate contact between the liquid and gas flowing downward co-currently. The packing causes the liquid to be divided into a multiple series of thin layer surfaces with the gas phase immediately adjacent to each thin layer of liquid. By this means the oxygen in the compressed air can dissolve in the solution and react with the dissolved NO to form $NO_2$ which reacts with the dissolved ferrous sulfate and sulfuric acid to form ferric sulfate and water. Simultaneously, NO is re-formed. As this occurs, the amount of ferrous sulfate in the solution is reduced. This diminishes the ability of the solution to retain dissolved NO. Consequently, NO enters the gaseous phase where it reacts with oxygen in the gaseous phase to form $NO_2$ which then oxidizes more ferrous sulfate. As the solution flows downward, it contains less and less ferrous sulfate and an increasing amount of NO enters the gas phase.

As explained above, the conversion of ferrous sulfate and sulfuric acid to ferric sulfate and water is exothermic. This raises the temperature of the solution which reduces the ability of the solution to dissolve NO. This further increases the amount of NO in the gas phase where it can immediately mix with and react with oxygen.

The lower part of zone (11) is widened so that it can act as a gasliquid separator. The liquid reaching the lower part of zone (11) is separated from the gaseous mixture of NO, $N_2$ and $O_2$. The separated liquid leaves the bottom outlet of zone (11). Some of the liquid which is pumped by pump (15) is passed into the upper liquid inlet of zone (14) through pipe (16). The remaining part of the liquid is recycled to the upper part of zone (11) through pipe (13) as mentioned previously.

This recycling has several beneficial effects. Since the flow of liquid and gas is downward and cocurrent, the column cannot flood. Consequently, the velocity of the solution moving downward can be much greater than would be possible if the solution were flowing upward. The solution being recycled is usually higher in temperature than the solution flowing from zone (7). When the two solutions mix, the temperature of the solution entering from zone (7) is raised. This assists the evolution of NO. It enters the gas phase where it can react with gaseous oxygen. Although the average ferrous sulfate concentration of the solution reaching the bottom of zone (11) is reduced, this has little effect on the rate of the overall reaction which is determined primarily by the reaction in the gas phase of NO and $O_2$.

The separated gas mixture in the lower part of zone (11) is directed to a gas inlet in the lower part of zone (14) by means of pipe (17). The internals of zone (14) contain means for obtaining intimate gas-liquid contacting as the gas flows upward counter-current to downward flowing liquid. As the liquid flows downward most of the dissolved ferrous sulfate is converted to ferric sulfate. The solution reaching the lower part of zone (14) is enriched in ferric sulfate and diminished in ferrous sulfate. It leaves zone (14) by means of pipe (18) and is recycled to the $H_2S$ contacting step.

It was stated above that compressed air is fed to the system by means of pipe (12). The amount of compressed air which enters zone (11) is controlled so that its oxygen content is substantially consumed in zone (14). Nitrogen leaving zone (14) is virtually oxygen free. The connection between zone (14) and zone (7) is by way of a top-hat arrangement. Gas can flow upward through the top outlet of zone (14). Liquid flowing downward in zone (7) is diverted by the hood over the gas inlet to zone (7). This causes the liquid to flow into the annulus around the gas inlet and out pipe (10) to zone (11).

The ability of the ferrous sulfate solution to preferentially absorb NO so that it is separated from the inert nitrogen is determined by the NO partial pressure, ferrous sulfate concentration, temperature and the ratio of the volume of solution to the volume of NO to be absorbed. The lower the temperature of the solution the greater is its ability to absorb NO so that it is preferable to have the solution be as low in temperature as its ferrous sulfate concentration will permit. In most instances this will be a temperature close to that of the available cooling water but not much lower than about 25° C.

As a generalization, the higher the ratio of moles of oxygen consumed per mole of NO recycled, the greater the amount of ferrous sulfate solution available for NO absorption.

Similarly, the higher the pressure in the system, the greater the ability of the ferrous sulfate solution to dissolve NO. Thus, in this particular method of practicing the invention, higher pressures provide benefits in addition to those described above.

The procedures depicted in FIGS. 1 and 2 are such that column (1) in FIG. 1 and the column made up of zones (7) (11), and (14) of FIG. 2 must be built to contain a large number of stages to insure the operation is carried out economically.

Figure 3:
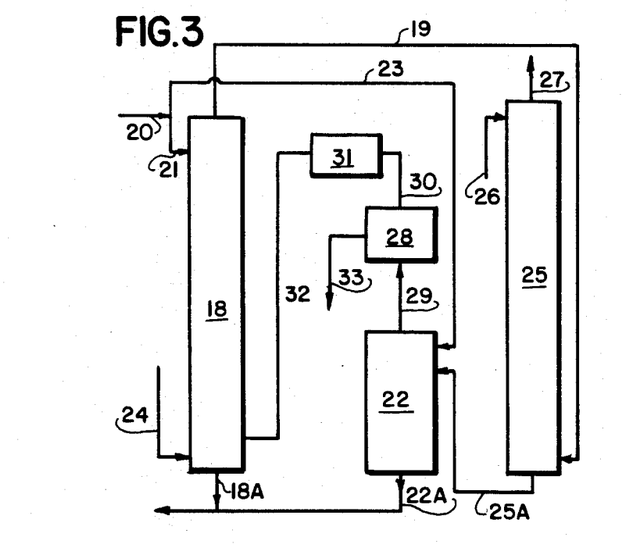
FIG. 3 is a flow diagram of a method of carrying out the invention which employs nitric acid technology to minimize loss of nitric oxide.

FIG. 3 depicts a procedure in which the loss of NO is held to a minimum by employing nitric acid technology. In FIG. 3, column (18) is similar in most respects to that of column (1). However, it can contain far fewer stages since the process is operated so that practically all of the NO leaving the top gas outlet of column (18) by way of pipe (19) is recovered. In FIG. 3, pipe (20) is used to deliver to the regeneration step the ferrous sulfate solution formed in the $H_2S$ contacting step not shown. The ferrous sulfate solution is divided. The bulk of it flows into column (18) by way of pipe (21). The remainder flows into NO formation reactor (22) by way of pipe (23). The manner in which the ferrous sulfate solution is divided is somewhat arbitrary. It is usually desirable to have at least 80% flow into column (18) and the remainder to reactor (22). Compressed air enters column (18) by way of piping (24) which enters column (18) through a gas inlet close to the column's bottom. Nitric oxide flows into the column at a location somewhat above that of the air inlet. By way of illustration, when the ferrous sulfate solution is divided 80-20, column (18) can be operated so that 90% of the ferrous sulfate fed to the column (18) is ozidized to ferric sulfate while the nitric oxide reactor is operated so that only about 50% of the ferrous sulfate fed to reactor (22) is oxidized to ferric sulfate. This, too, is arbitrary. It is done to insure that all of the nitric acid which is supplied to the NO reactor is converted to NO. Lower or higher percentages can be oxidized by appropriate changes in the other parts of the process.

For example, column (18) can be constructed and operated with the equivalent of about 6 stages i.e. only about 6 moles of oxygen will react with each mole of NO supplied to the column. An excess of oxygen in the form of air is also fed to the column. As a result, a considerable amount of unused oxygen leaves the column with the NO. A suitable ratio is to have one mole of oxygen in the exiting gas stream for each mole of NO. This will provide a suitable excess of oxygen for the nitric acid production step. The nitric acid production column (25) is supplied with the gas mixture leaving column (18) by means of piping (19). Water is also supplied to nitric acid production column (25) by water feed line (26).

In the nitric acid production column nitric acid is produced in accordance with the overall reaction:

(9) $2NO + H_2O + 1.5O_2 = 2HNO_3$

From this reaction it can be seen that when the gas mixture leaving column (18) contains an equal number of moles of $O_2$ and NO, sufficient $O_2$ will be available to convert substantially all of the NO to nitric acid. A small fraction of the oxygen initially fed to the system will be vented through vent pipe (27) connected to the top gas outlet of column (25).

Nitric acid production column (25) is a typical nitric acid production unit. Although in this example the ratio of nitrogen to $O_2$ and NO is somewhat greater than that employed when making nitric acid from ammonia, the difference is not great. Moreover, it is not essential to produce very concentrated nitric acid although the more concentrated the acid the better. No difficulty is experienced in making acid whose concentration is in excess of 40%.

The nitric acid produced in column (25) is fed to NO reactor (22). In reactor (22) nitric acid is reacted with an excess of the sulfuric acidferrous sulfate solution at the boiling point of the mixture. To simplify this step of the process, although not essential, the pressure employed is below that used in the remainder of the process. The nitric acid is converted to NO by the ferrous sulfate:

(10)
$6FeSO_4 + 3H_2SO_4 + 2HNO_3 = 3Fe_2(SO_4)_3 + 2NO + 4H_2O$

The mixture is subjected to boiling until substantially all of the nitric acid has been converted to NO and the water introduced with the nitric acid and that formed in the reaction are vaporized. It is also convenient to boil off some of the water which was part of the ferrous sulfate solution. Water is also formed in the regeneration step using NO and oxygen. By boiling off some of the water which was present in the ferrous sulfate solution, the water balance of the overall process can be controlled.

The vapor leaving the NO formation reactor flows into heat exchanger (28) by means of piping (29). Practically all the water is condensed. All of the NO stays in the vapor phase. It flows out of the heat exchanger's gas outlet and by way of piping (30) is fed to compressor (31). The NO is compressed to a pressure sufficiently high to be recycled by way of piping (32) to column (18). The condensed water is removed from the process by means of piping (33).

In using this version of the invention it is desirable to operate column (18) and the nitric acid column at an elevated pressure. The nitric acid formed in the nitric acid column 25 is fed to NO reactor 22 by means of piping 25A. The regenerated, acidic ferric sulfate solutions formed in column 18 and NO reactor 22 are recycled to the H$_2$S contacting step by piping 18A and 22A.

Having a substantial excess of oxygen at all times in column (18) is beneficial since the excess oxygen increases the rate at which NO is oxidized to NO$_2$ by elemental oxygen and therefore speeds the oxidation of ferrous sulfate.

When a gas at a relatively low pressure contains a small amount of H$_2$S, and the H$_2$S has to be removed primarily to eliminate an obnoxious odor, use of the invention becomes attractive by employing low cost equipment in a simple operating mode.

This is achieved by contacting the H$_2$S-containing gas with a relatively small volume of iron sulfate solution which is constantly recycled. By recycling it becomes possible using a small amount of liquid to achieve the equivalent of having a high ratio of treating solution to gas in the H$_2$S contacting step. For example, should it be necessary to remove about 17 pounds of H$_2$S per hour and convert it to sulfur, the composition of a suitable treating solution can contain about 0.15 pound moles of Fe$_2$(SO$_4$)$_3$ and 1.2 pound moles of FeSO$_4$ per 1,000 pounds of solution. Over the course of an hour close to 1,111 pounds of solution are fed to the solution being recycled. The composition of the feed solution can consist of close to 0.6 moles of Fe$_2$(SO$_4$)$_3$ and 0.3 moles of FeSO$_4$ per 1,000 pounds of solution. Simultaneously, over the course of an hour about 1,111 pounds of solution are withdrawn from the solution being recycled. This solution has sulfur particles dispersed in it. The sulfur particles are separated in some intervening equipment and the now sulfur-free, ferrous sulfate solution fed to the regeneration step.

The regeneration step can be accomplished in any available liquid-gas contacting equipment. Only by way of illustration, an equipment arrangement such as shown in FIG. 4 is suitable.

Figure 4:
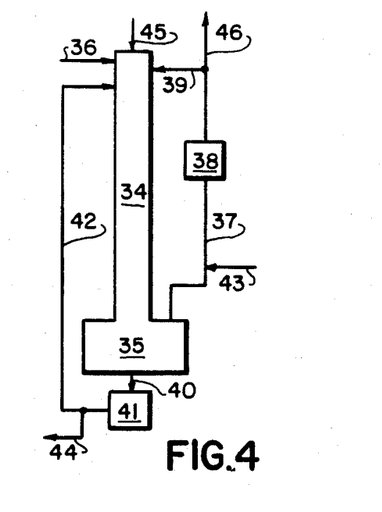
FIG. 4 is a flow diagram of a method of carrying out the invention when the amount of $H_2S$ to be converted to sulfur is so small that the cost of the equipment employed to regenerate the ferrous sulfate-sulfuric acid-containing solution must be small in order that the use of this invention be economically attractive.

Item (34) in FIG. 4 depicts a static mixer in a vertical position. Many kinds of static mixers are available and sold under such trade names as Kenics, Komax, Sulzer and Luwa. As a mixture of gas and liquid flow concurrently through devices of this kind, a large interfacial area is generated while the mixture travels a short distance. This condition brings any component of the gas phase into the immediate proximity of a liquid surface providing the opportunity for the component to dissolve in the liquid if there is even a slight dissolving driving force. At the same time this brings any substance in the liquid which has any escaping tendency to the interface allowing the dissolved gas to enter the gas phase.

There is no problem with flooding when the liquid and the gas to be contacted flow cocurrently downwards through the mixer into a gasliquid separator (35). The liquid flows into and occupies the lower portion of the separator. The immiscible, less dense gas separates from the liquid and occupies the upper portion of the separator. The gas in this instance is mostly nitrogen containing a small amount of NO and oxygen. The ratio of moles oxygen to NO is preferably about 1 but there is no critical ratio. The separated solution is a solution containing close to 0.6 moles of Fe$_2$(SO$_4$)$_3$ and 0.3 moles of FeSO$_4$ per 1,000 pounds of solution. Over the course of about an hour close to 1,111 pounds of this solution is bled by means of pipe (44) from the recycling solution and becomes one of the feeds to the H$_2$S removal column. Simultaneously, as mentioned previously, over the course of an hour close to an equal weight of solution is fed to the regeneration column by means of pipe (36) from the solution being recycled in the H$_2$S removal column.

The gas which separates in the gas-liquid separator leaves the separator from its upper gas outlet which is connected by pipe (37) to the suction side of blower (38). The blower recycles the gas to the upper section of column (34) by means of pipe (39) from which it flows downward once again through the static mixer.

The liquid flowing into the gas-liquid separator leaves by a bottom outlet through pipe (40) connected to the suction side of pump (41). The pump returns it to the upper section of the column for recycling through the static mixer by means of pipe (42).

Air is continuously fed to the system from pipe (43) connected to recycle line (37) to replenish both the oxygen consumed in the regeneration reaction and lost when the excess gas that accumulates in the system is vented. NO or NO$_2$ is also fed to the system by means of pipe (45). The composition of the gas being recycled is kept substantially constant by the controlled addition of air and NO or NO$_2$ and controlled venting. Venting is from outlet pipe (46).

The system is operated so that a substantial amount of sulfur is formed for every pound of NO which is vented. There is no critical ratio between the two - obviously, the more sulfur recovered per pound of NO leaving the system, the more efficient the operation in terms of NO cost. This must be balanced against pumping costs, the energy required to circulate the gas and the cost of the equipment. In most instances, the NO content of the gas stream vented will be in the range 0.03% to 0.15%.

When the invention is practiced in this manner, the pressure can be at any convenient level. The higher the pressure, the smaller the equipment can be per mole of O$_2$ consumed in the reaction. By using somewhat larger equipment and expending more energy for solution pumping and gas circulation, the entire process can be carried out at substantially atmosperic pressure. The protracted time and the many opportunities for intimate gas-liquid contacting which a system of this kind provides compensate for the slow rate at which NO and O$_2$ react to form NO$_2$ when the concentration of the reactants is small and the pressure is low.

In this example it has been assumed that per hour 17 pounds of H$_2$S are removed from a gas and converted to sulfur. When this quantity of H$_2$S is present as a contaminant in a gas at atmospheric pressure and the gas is mostly air and the H$_2$S is present in a concentration of 0.02% by volume, this quantity of H$_2$S will be present in 2,500 pound moles of air or about 1 million cu. ft. To insure the intimate contacting and removal of this small amount of H$_2$S from this large volume of air, the gas must be contacted with the equivalent of a large volume of treating solution even though the amount of ferric sulfate reduced is small. If a countercurrent liquid-gas contacting column is used and the gas flows upward at a superficial velocity of 10 feet a second, a column about 6.5 ft. in diameter will be needed. The column would have to be packed to a height of about 30 feet. To obtain good gas-liquid contacting the liquid flow rate should be about 10 gallons per sq. ft. per minute. In this instance the liquid recycling rate would be about 300 gallons/minute.

In the regeneration column depicted in FIG. 4 per hour only about 35 pounds of air containing about 8 pounds of oxygen are fed to the system. The weight of gas vented from the system per hour will be close to 27 pounds. It will be principally nitrogen contaminated with about 0.05 to 0.03 percent NO and about twice this percentage of oxygen.

The static mixer need be only 4 inches in diameter and perhaps 10' high. A suitable gas velocity is about 15 feet per second. The solution is circulated at the rate of about 20 gallons per minute.

From the above description it will be noted that there is no necessary relationship between the size of the equipment in the $H_2S$ contacting step and the size of the equipment used in the regeneration step. The former is appropriate for the large volume of gas that has to be treated per hour. The latter by the amount of ferrous sulfate that must be oxidized per hour.

In this version of the invention, again, no attempt is made to recover the NO that leaves with the nitrogen. The NO goes through the NO to $NO_2$ to NO cycle many times. It is carried out at substantially constant temperature. There is no specific zone in which NO is oxidized to $NO_2$ and then absorbed, transported in one form or another to another zone and in this latter zone reduced to NO. The maximum pressure in the system is the pressure at the outlet side of the blower.

In describing the invention air is mentioned as the source of the oxygen that reacts with the nitric oxide to form nitrogen dioxide. Air is always available. In most instances, but not necessarily in all, it is the least costly oxygen source. If a more concentrated source is available at a cost which makes its use economically attractive, it can be substituted for air. Such a source provides economies in energy expenditures, equipment cost and the cost of replacing the inevitable loss of some of the nitric oxide. That is, less nitric oxide will be lost per unit of sulfur formed. The phrase, gas containing oxygen is used to embrace air as well as more concentrated oxygen sources.

As defined above, the expression super-atmospheric pressure used in the claims below is the pressure, not less than 5 pounds per square inch above atmospheric pressure, exerted by the gas when it leaves contact with the ferrous liquid.

The various methods of carrying out the invention described above do not exhaust the many different ways of practicing the invention. Accordingly, the above procedures are not to be regarded as limiting.

What is claimed:

1. In a regenerable process for the removal and conversion to sulfur of the hydrogen sulfide contained in a gas in which the gas is contacted with a regenerated, acidic, ferric sulfate-containing reaction medium to react the bulk of the hydrogen sulfide with ferric sulfate to form a slurry of sulfur dispersed in the reaction medium, a mole of ferrous sulfate and a half mole of sulfuric acid being formed in the reaction medium for each half mole of hydrogen sulfide converted to sulfur; the sulfur separated from the reaction medium; the acidic, ferric sulfate-containing reaction medium being regenerated from the ferrous sulfate-containing reaction medium and the regenerated reaction medium recycled to the hydrogen sulfide contacting operation; the improvement which comprises the steps of:
   (a) at a low temperature, which temperature is above that sufficient to maintain ferrous sulfate within the medium, continuously contacting the ferrous sulfate-containing reaction medium with a gas containing oxygen and nitric oxide, the ratio of moles of oxygen to moles of nitric oxide in said gas being less than about sixty-one (61) to one (1) to form a regenerated, acidic, ferric sulfate-containing reaction medium and a gas mixture, said gas mixture containing all of the nitric oxide and a diminished oxygen content;
   (b) continuously separating said regenerated, acidic ferric sulfate-containing reaction medium from said gas mixture; and
   (c) recycling said regenerated, acidic ferric-sulfate-containing reaction medium to the hydrogen sulfide contacting operation;

2. The process of claim 1 in which steps (a) and (b) are carried out at super-atmospheric pressure.

3. The process of claim 1 in which steps (a) and (b) are carried out within the approximate temperature range of 20° C. and 45° C.

4. The process of claim 1 in which in step (a) the gas-liquid contacting is carried out counter-currently.

5. The process of claim 1 in which in step (a) the mixture of gas and regenerated, acidic ferric sulfate-containing reaction medium is cooled by indirect cooling means to remove regeneration reaction heat.

6. The process of claim 1 in which the gas mixture separated in step (b) is vented from the process.

7. The process of claim 1 in which the gas mixture separated in step (b) is contacted with the ferrous sulfate-containing reaction medium to absorb nitric oxide to form a solution in which the nitric oxide is dissolved in the ferrous sulfate-containing reaction medium and feeding the solution so formed to step (a).

8. In a regenerable process for the removal and conversion to sulfur of the hydrogen sulfide in a gas mixture in which the gas is contacted with a regenerated, acidic ferric sulfate reaction medium to react the bulk of the hydrogen sulfide with ferric sulfate to form a slurry of sulfur dispersed in the reaction medium, a mole of ferrous sulfate being formed in the reaction medium for each half mole of hydrogen sulfide converted to sulfur; the sulfur separated from the reaction medium; the acidic, ferric sulfate-containing reaction medium being regenerated from the ferrous sulfate-containing reaction medium and the regenerated reaction medium recycled to the hydrogen sulfide contacting operation; the improvement which comprises the steps of:
   (a) dividing the ferrous sulfate-containing reaction medium into a major fraction and a minor fraction;
   (b) at a low temperature, which temperature is above that sufficient to maintain ferrous sulfate within the medium, continuously contacting said major fraction with a gas containing oxygen and nitric oxide, the ratio of the moles of oxygen to moles of nitric oxide in said gas being less than about sixty-one (61) to one (1); to form a regenerated, acidic, ferric sulfate-containing reaction medium and a gas mixture, said gas mixture containing all of the nitric oxide and a diminished oxygen content;

(c) continuously separating said regenerated, acidic ferric sulfate-containing reaction medium from said gas mixture;
(d) recycling said regenerated, acidic ferric sulfate-containing reaction medium to the hydrogen sulfide contacting operation;
(e) converting the nitric oxide in the gas mixture separated in step (c) to nitric acid;
(f) reacting the nitric acid formed in step (e) with the minor fraction of the ferrous sulfate-containing reaction medium separated in step (a) to form nitric oxide and a regenerated, acidic ferric sulfate-containing reaction medium and separating said ferric sulfate-containing reaction medium from the nitric oxide;
(g) recycling the separated, ferric sulfate-containing reaction medium to the hydrogen sulfide contacting operation and recycling the separated nitric oxide to step (b).

9. The process of claim 8 in which step (b) is carried out within a temperature range of 20° C. to 45° C.

* * * * *

UNITED STATES PATENT AND TRADEMARK OFFICE
CERTIFICATE OF CORRECTION

PATENT NO. : 4,693,881

DATED : September 15, 1987

INVENTOR(S) : Ralph Miller

It is certified that error appears in the above-identified patent and that said Letters Patent is hereby corrected as shown below:

Col. 3, line 48 at (4) — 2 should be on the same line as $FeSO_4$, etc.

Col. 5, line 34 — gasliquid should be gas-liquid

Col. 5, line 40 — $O_2$to should be $O_2$ to

Col. 10, line 44 — gasliquid should be gas-liquid

Col. 12, line 47 — acidferrous should be acid ferrous

Col. 13, line 53 — concur- should be cocur-

Col. 13, line 66 — gasliquid should be gas-liquid

Signed and Sealed this

Twenty-sixth Day of January, 1988

Attest:

DONALD J. QUIGG

Attesting Officer     Commissioner of Patents and Trademarks